United States Patent

Compagnon

Patent Number: 5,370,596
Date of Patent: Dec. 6, 1994

[54] CERAMIC AND METAL ROLL ASSEMBLY

[75] Inventor: Jean C. Compagnon, Hautmont, France

[73] Assignee: Vesuvius Crucible Company, Pittsburgh, Pa.

[21] Appl. No.: 62,389

[22] Filed: May 14, 1993

[30] Foreign Application Priority Data

May 18, 1992 [FR] France ................... 92 06100

[51] Int. Cl.$^5$ ................................ F27D 3/00
[52] U.S. Cl. ...................... 492/45; 29/450; 29/895.2; 403/29; 403/404; 432/246; 492/42; 492/47
[58] Field of Search ............ 29/436, 447, 450, 451, 29/455.1, 895.2; 403/28, 29, 30, 179, 243, 278, 265, 267, 357, 404; 492/21, 42, 45, 47; 428/616, 680; 432/246

[56] References Cited

U.S. PATENT DOCUMENTS

| | | | |
|---|---|---|---|
| 4,281,941 | 8/1981 | Rottenkolber | 403/30 X |
| 4,399,598 | 8/1983 | Page et al. | 29/115 |
| 4,404,011 | 9/1983 | McMaster | 65/181 |
| 4,499,646 | 2/1985 | Allor et al. | 29/447 |
| 4,772,139 | 9/1988 | Bretton | 403/29 X |
| 5,028,162 | 7/1991 | Tsuno et al. | 403/30 |
| 5,048,168 | 9/1991 | Vanaschen et al. | 432/246 |
| 5,104,747 | 4/1992 | Makino et al. | 403/29 X |
| 5,108,625 | 4/1992 | Kang et al. | 403/404 X |
| 5,134,812 | 8/1992 | Hoffman et al. | 403/404 X |
| 5,146,675 | 9/1992 | Ford et al. | 492/47 X |

FOREIGN PATENT DOCUMENTS 2393747  1/1979  France.

OTHER PUBLICATIONS

French Search Report which issued in connection with FR 9206100.

*Primary Examiner*—Mark Rosenbaum
*Assistant Examiner*—S. Thomas Hughes
*Attorney, Agent, or Firm*—Webb Ziesenheim Bruening Logsdon Orkin & Hanson

[57] ABSTRACT

A joint between an end of a ceramic roll and a metal ferrule compensates for the differences in the thermal expansion properties of the joined materials. A plurality of thermodeformable bimetal elements are positioned in the space between the roll end and the ferrule to expand when the temperature increases to accommodate the greater thermal expansion of the ferrule relative to the roll and to provide a selected coupling strength in the joint at a given operating temperature. The roll is preferably made from a vitreous, fused silica material and is suitable for supporting glass and metal in sheet, strip or plate form at elevated temperatures.

4 Claims, 6 Drawing Sheets

CERAMIC AND METAL ROLL ASSEMBLY

BACKGROUND OF THE INVENTION

The present invention relates generally to joining dissimilar materials and, more particularly, to joining materials having different coefficients of thermal expansion.

The present invention provides a method and a joint for forming an assembly of a first material, for example, a ceramic material, and a second material, for example, a metallic material. The present invention provides consistent joint quality despite high temperature variations to which the joined assembly is subjected and despite the possible significant differences in the coefficients of thermal expansion of the materials constituting the joined assembly.

A more particular object of the invention is to provide a method and joint construction for forming an assembly of a ceramic material, for example, vitreous, fused silica, with a metal material, such as steel.

The method of the invention is preferably used to join at least one metallic piece to a cylinder of vitreous, fused silica. Such a fused silica cylinder, in the form of a roll, is designed to rotatably support a load that is moveably displaced on a series of identical rotatable rolls mounted side by side in a furnace, for example. This load may typically be in the form of a strip or plate of steel or glass material, for example.

U.S. Pat. No. 4,399,598 describes a ceramic roll for transporting sheets of glass during heat treatment thereof. Each cylindrical roll is rotatably mounted on bearings by means of steel ferrules mounted with extra space or "play" provided for thermal expansion at each end of the roll. One or more radially compressible split rings are placed in the space between the outer diameter of the cylindrical roll and the inner diameter of the ferrule.

A roll of a similar type, comprising a cylinder of refractory material, having metal ferrules fixed at the ends, is also known from U.S. Pat. No. 4,404,011. Some space is provided between the ferrules and the ends of the roll. Longitudinal metal strips are placed in these spaces to function as springs to accommodate the play between the ferrules and the roll ends.

These known systems in the prior art make it possible to take up the differential thermal expansions which occur during a change in temperature. In effect, the cylindrical roll of refractory material hardly expands at all, while the metal ferrules expand a great deal. The dimensional play between the roll and the ferrules consequently varies in substantial proportions as a function of the temperature. As a result, it is necessary to provide elastic devices in the spaces between the roll ends and the ferrules to accommodate the play. However, one disadvantage of these prior elastic devices resides in the fact that the joining forces between the roll and the ferrule decrease as the temperature rises. This is due to the drop in the mechanical properties of the elastic springs and also due to the increase in dimensional play resulting from the greater thermal expansion of the metal ferrule. The maximum value of the joining force is obtained during the prestressing of the ferrule on the roll at ambient temperature. This prestressing value is limited by the resistance of the materials. These parameters thus limit the temperature range where good functioning is possible. Assemblies obtained by adhesive bonding are also known in the prior art. However, these assemblies also present shortcomings. The quality of the bond is temperature-limited, caused in part by the loss of mechanical properties of the adhesive at elevated temperatures.

The method and apparatus of the present invention remedies the disadvantages found in the prior art. The invention makes it possible to control the compressive loading in the joint between the metal ferrule and the ceramic roll, for different assembly diameters as well as for different roll and ferrule materials and different operating temperatures.

SUMMARY OF THE INVENTION

These goals and properties are achieved by interposing between the refractory ceramic roll and the metal ferrule a plurality of thermodeformable bimetal elements. The characteristics of the thermodeformable bimetal elements are chosen as a function of the differential expansion, the machining play and tolerance, the compressive loading necessary for the high temperature functioning and the value of prestressing force required for the assembly at ambient temperature.

One of the advantages of the present invention resides in the ability to modulate the compressive forces in the joint coupling the roll and ferrule, making it possible to keep the joint loading constant, or to render the loading progressive or degressive during temperature variations.

Another advantage of the present invention is to assure good centering of the ferrules relative to the roll.

This results in good geometric characteristics of the roll assembly during use even at temperatures higher than those permitted by currently known designs.

The thermodeformable bimetal elements are preferably designed so that the compressive forces in the joint between the two pieces are independent of the operating temperature of the unit. Alternatively, the bimetal elements may be designed so that the joint strength between the two pieces increases or decreases as a function of the operating temperature of the roll assembly.

The bimetal elements may be in the form of either thin strips or platelets, discs or washers. They may be mounted in series, in parallel or in series-parallel. These elements may also be pre-assembled in a cartridge which may be thermodestructible.

According to another feature of the invention, the bimetal element or elements may be associated with at least one non-bimetal element, elastic or not.

The joint can be effected with the aid of a combination of thermodeformable elements and another conventional system such as a spring, adhesion or other conventional means.

The thermodeformable bimetal elements may be fixed either on the roll or on the ferrule or may be unfixed. The thermodeformable bimetal elements may be pre-arched. The invention is applied to the joint between a roll and an external ferrule. Other characteristics and advantages of the invention will become more apparent after reading the following description of the several presently preferred embodiments taken with the attached drawing figures.

DESCRIPTION OF THE PREFERRED EMBODIMENTS

Figure 2:
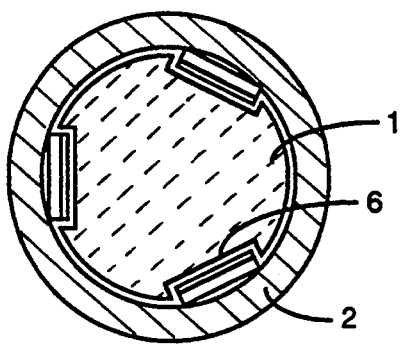
FIG. 2 is a cross-sectional end view of the roll and ferrule taken along line II—II of FIG. 1.
Figure 1A:
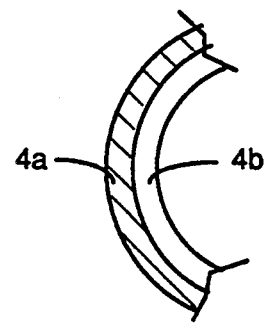
FIG. 1A is an enlarged, partially fragmented side view of a bimetallic element used in the present invention.
Figure 1:
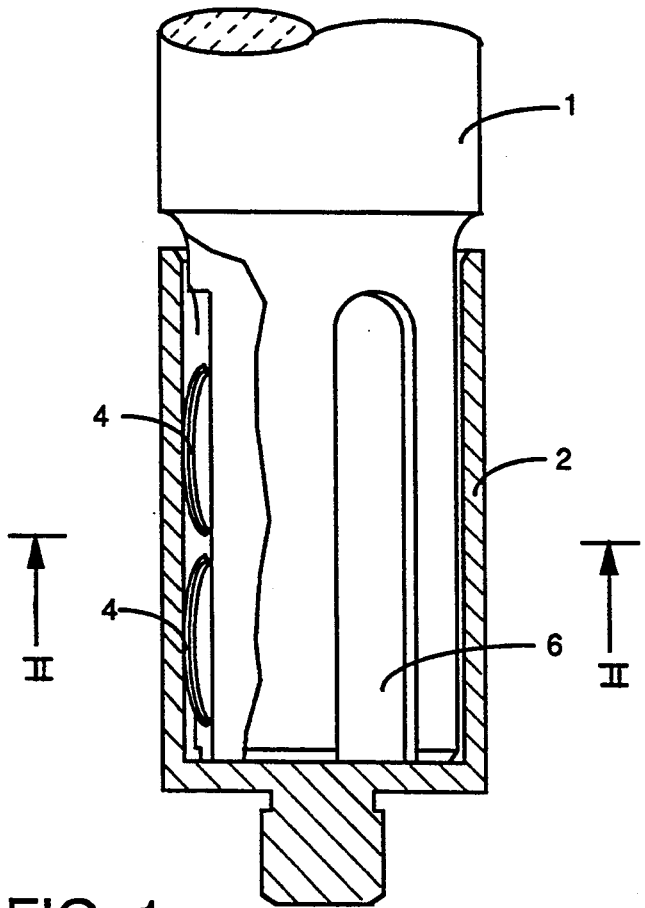
FIG. 1 is a partially fragmented, side sectional view of a roll end and ferrule joined according to the invention.

Reference numeral 1 designates a rotatable roll in FIGS. 1 and 2. The roll 1 is made from a refractory ceramic material having a low coefficient of thermal expansion, for example, vitreous or fused silica. Only one end of the roll 1 is shown. The roll has a cylindrical body portion, generally with a constant diameter. Each end of the roll 1 has a cylindrical end portion of smaller diameter for receiving a ferrule 2. The ferrule is usually made of a material different from that of the roll, usually a metal such as steel. The coefficient of thermal expansion of the ferrule 2 is consequently much greater than that of the ceramic material of the roll 1. As a result, the space between the outside diameter of the end portion of the roll 1 and the inside diameter of the ferrule 2 increases greatly as the operating temperature of the joined assembly increases.

According to the invention, thermodeformable bimetal elements 4 are provided in this area to accommodate the dimensional increase or "play" which results from the differing thermal expansion properties of metal and ceramic materials. In one preferred embodiment, the bimetal elements 4 are placed in longitudinal grooves 6 formed in each of the ends of the roll 1. As depicted in FIGS. 1 and 2, three grooves 6 are formed on each roll end into which six bimetal elements 4 are located (two in each groove). The bimetal elements 4 are comprised, for example, of strips of intimately bonded nickel and nickel alloy. The thermodeformable bimetal elements at ambient temperature have an initial predeflection camber in the natural direction of deformation which takes place with a temperature rise. This predeflection is designed to assure a spring-type pretensioning at ambient temperature that facilitates a tight roll-ferrule joint and the transmission of a sufficient couple by virtue of the compressive loading provided by the arcuately shaped bimetal elements 4.

As shown in FIG. 1A, the metal strip of the bimetal element 4 having the higher coefficient of thermal expansion designated 4a is located outside of the cambered part, while the second metal strip designated 4b having a lower coefficient of thermal expansion is located on the inside. When the temperature of the assembly rises, the play due to differential thermal expansion between the roll 1 and the ferrule 2 increases, but at the same time the camber of the bimetal elements 4 increases due to the greater expansion of the metal strip 4a. Thus, the increase in play is compensated by the increase in camber of the bimetal elements 4. As a result, the transferable couple or coupling strength as well as the alignment of the roll and the ferrule can remain essentially constant and the assembly can be used at a higher temperature than the assemblies of the prior art. Operating temperatures upwards of 750° C. or more are possible with the present invention. By appropriately choosing the number and size of the thermodeformable bimetal elements 4, it is also possible to control the variation in the transferable couple or loading as a function of the temperature. For example, bimetal elements 4 may be selected to thermally expand in the camber direction a greater amount than the expected increase in play between the roll and ferrule at a given operating temperature. Such an increase in camber in effect increases the transferable couple of the joint as the temperature increases.

The predeflection camber of the arcuate bimetal elements 4 is preferably between about 0.2 and 2.5 mm.

To facilitate the assembly of the unit, the thermodeformable bimetal elements 4 could be preassembled on the roll or on the ferrule, for example, by thermally destructible adhesion. In addition, the ferrule or ferrules may be pre-heated to thermally expand the ferrule so as to reduce the press-on force required during assembly.

According to one preferred assembly variant, the thermodeformable bimetal elements 4 are prepositioned in a cage. It is also possible to cool the bimetal elements lower than ambient temperature to produce an inverse deflection which cancels or minimizes the initial predeflection camber to provide an easier assembly of the roll and ferrule.

According to another variation, the thermodeformable bimetal elements 4 are prepositioned and/or prestressed in thermally destructible containers.

Figure 4:
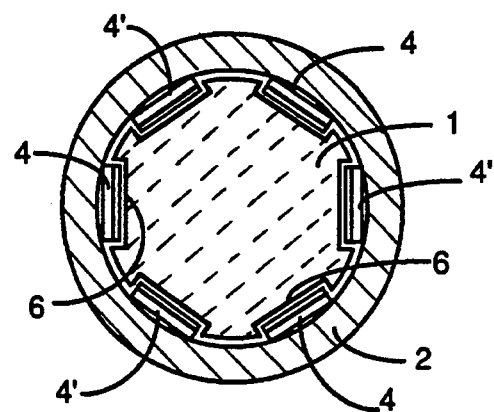
FIG. 4 is a cross-sectional end view taken along line IV—IV of FIG. 3.
Figure 3:
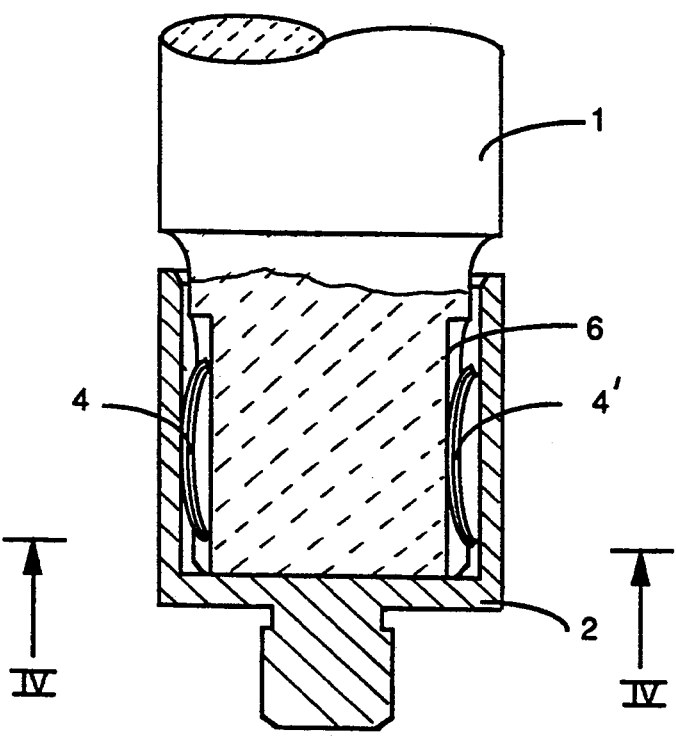
FIG. 3 is a view similar to FIG. 1 of a further embodiment of the invention.

FIGS. 3 and 4 show a further embodiment which functions identically to that discussed with reference to FIGS. 1 and 2. In this embodiment, the end of roll 1 has six grooves 6 instead of three, but each of these grooves has only one thermodeformable bimetal element 4 positioned therein. Thus, an element 4 of a given camber direction is placed between two elements 4 of opposite camber. Thus, the elements 4 are positioned so that their camber is inversed with respect to an adjacent bimetal element 4. As explained with reference to FIG. 1, the bimetal strips are dished so that the metal 4a with the greater coefficient of expansion is located on the outside. The same is true in the embodiment of FIGS. 3 and 4. But, as shown on the left in FIG. 3, the concavity of the bimetal element 4 is directed toward the ferrule 2 while, as shown on the right of the same FIG. 3, the concavity of the other half of the elements 4' is directed toward the roll 1. The left hand element 4 thus presents a point of contact with the ferrule 2 and two points of contact with the roll 1 while, inversely, the right hand element 4' presents a single point of contact with the roll 1 and two points of contact with the ferrule 2. Three generatrices of contact of bimetal elements on the ferrule and on the roll are thus defined. For short ferrules, this type of assembly makes it possible to multiply the number of contact generatrices and thus avoid the swivel effect that would occur if the concavity of the deformable elements is always directed toward the ferrule or toward the roll. This embodiment may be used where it is necessary to have a short ferrule which prohibits the use of two bimetal elements 4 in end to end alignment, as shown in FIGS. 1 and 2.

Figure 6:
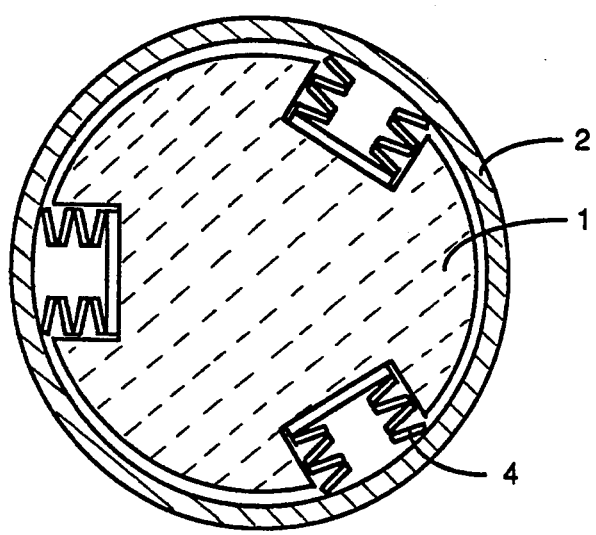
FIG. 6 is a cross-sectional end view of the roll and ferrule taken along line VI—VI of FIG. 5.
Figure 5:
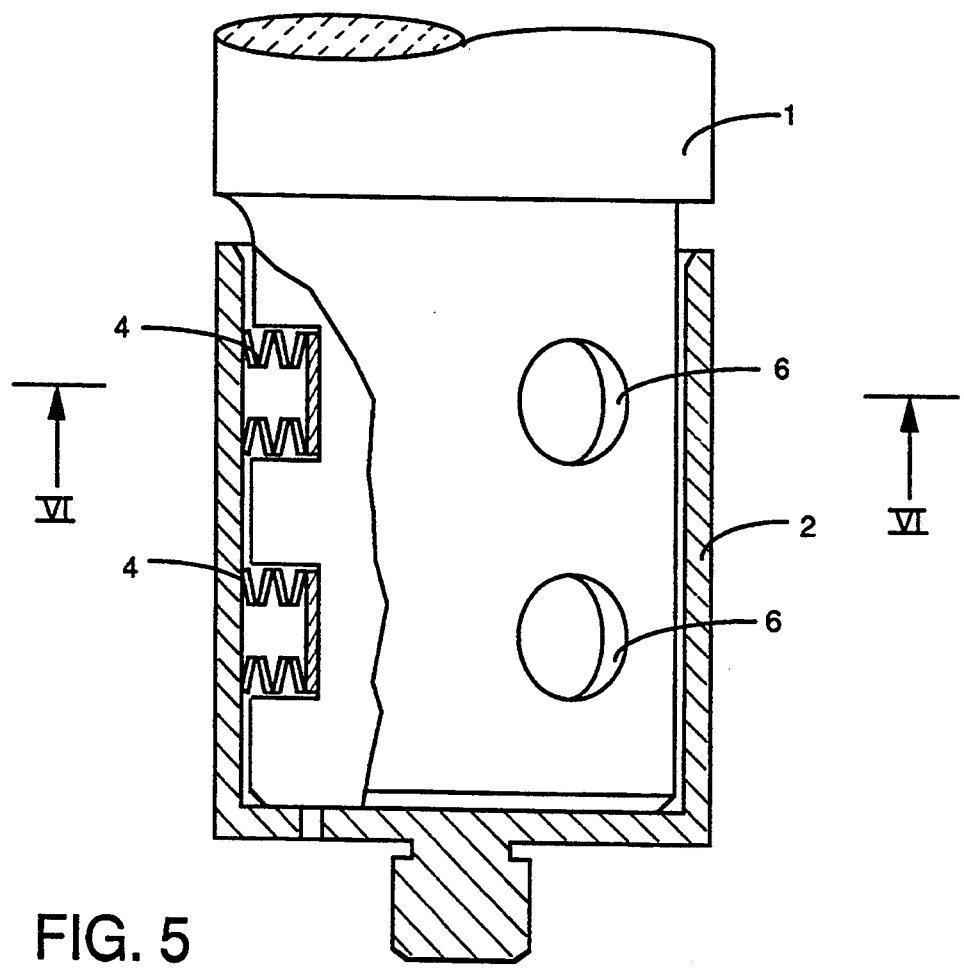
FIG. 5 is a view similar to FIGS. 1 and 3 of a third embodiment of the invention.

FIGS. 5 and 6 depict another variant in which the thermodeformable bimetal elements 4 comprise discs or washers in a form analogous to that of the well known Belleville-type elastic washer. These discs or washers are placed in cylindrical seats 6 formed in the end portions of the roll 1. In the embodiment shown in FIGS. 5 and 6, the thermodeformable discs or washers are arranged in series so that their unitary deflections are additive. This permits a greater amplitude of movement of the discs or washers to accommodate a greater play. The joining force applied is that applied by a single disc or washer.

Figure 8:
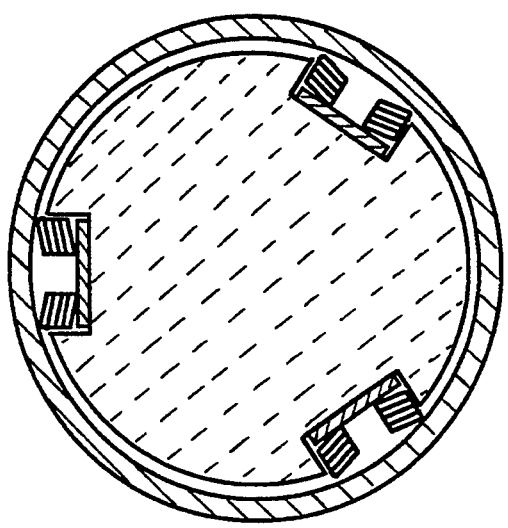
FIG. 8 is a cross-sectional end view of the roll and ferrule taken along line VIII—VIII of FIG. 7.
Figure 7:
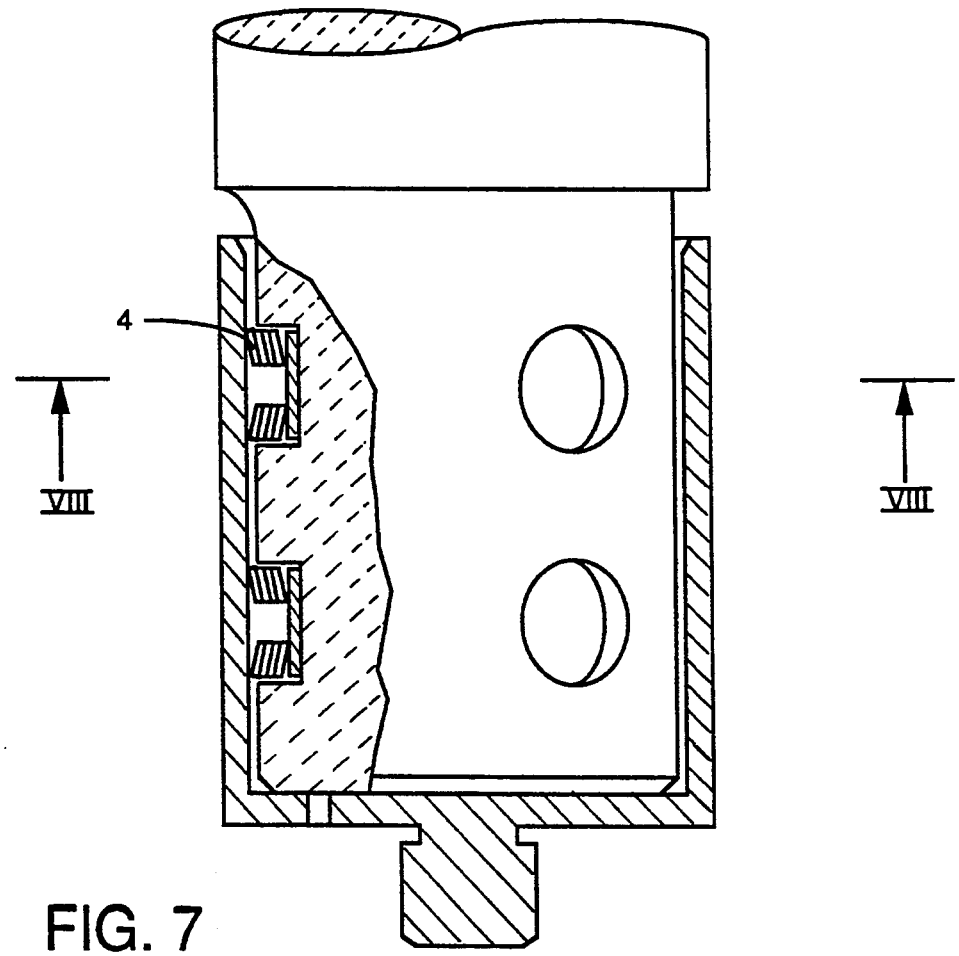
FIG. 7 is a view similar to FIGS. 1, 3 and 5 of a fourth embodiment of the invention.
Figure 10:
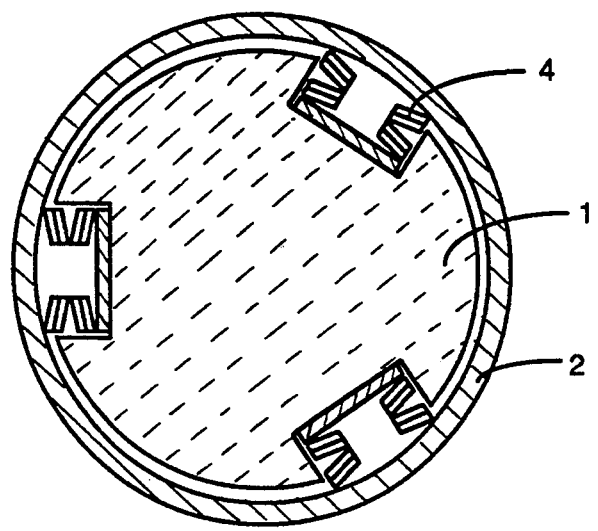
FIG. 10 is a cross-sectional end view of the roll and ferrule taken along line X—X of FIG. 9.
Figure 9:
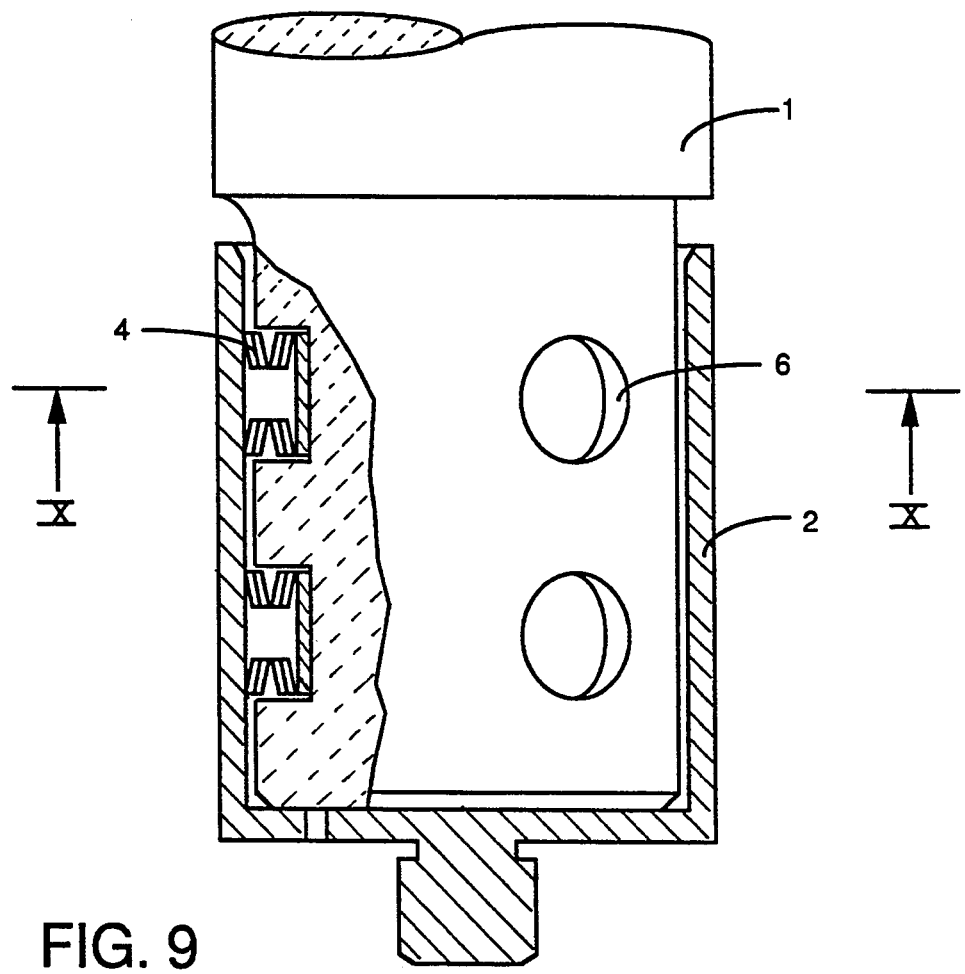
FIG. 9 is a view similar to FIGS. 1, 3, 5 and 7 of a further embodiment of the invention.

FIGS. 7 and 8 show a variant of FIGS. 5 and 6 in which the discs or washers are arranged in parallel instead of in series. The loading force exerted by each of the thermodeformable elements 4 are additive, but the dimensional amplitude of the deflection is that produced by a single disc or washer. In FIGS. 9 and 10, the thermodeformable elements 4 are placed in series-parallel, which facilitates combining the advantages of the two embodiment variants described above, for example, obtaining a loading and simultaneously a deflection amplitude of the deformable elements greater than those of a single disc or washer.

Figure 12:
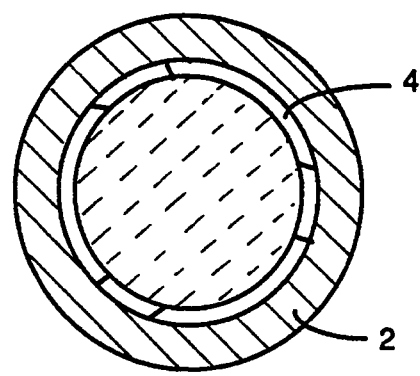
FIG. 12 is a cross-sectional end view of the roll and ferrule taken along line XII—XII of FIG. 11.
Figure 11:
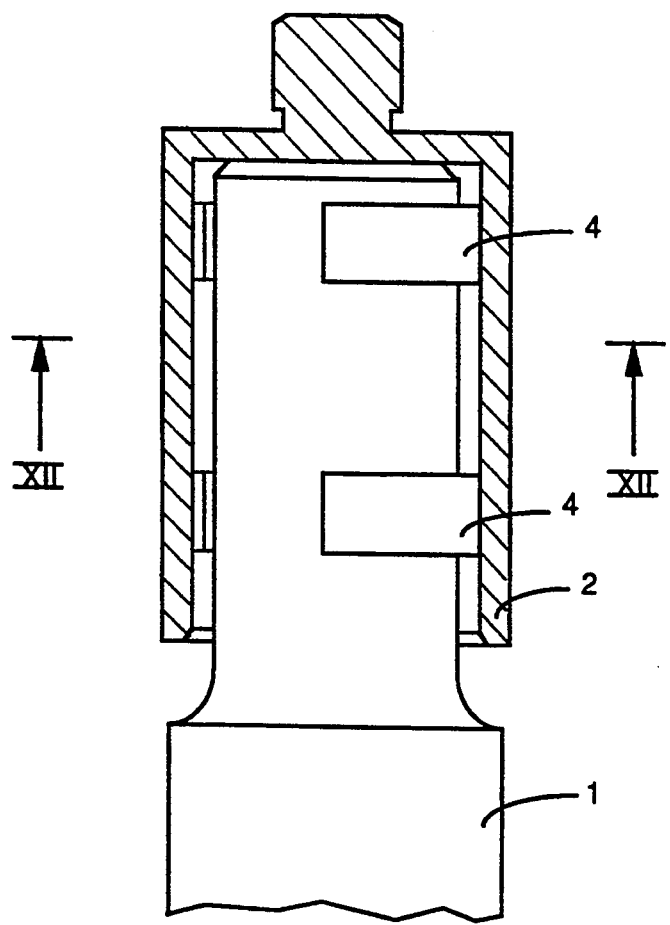
FIG. 11 is a view similar to FIGS. 1, 3, 5, 7 and 9 of a still further embodiment of the invention.

FIGS. 11 and 12 show a further embodiment in which the thermodeformable bimetal elements 4 are metal strips arranged circumferentially on a terminal part of smaller diameter of the roll 1. The strips preferably have a precamber that corresponds to the diameter of the end portion of the roll or which is slightly larger if one wishes to obtain a prestressing at ambient temperature.

If it is desirable to obtain a transferred couple that is constant or increasing with the operating temperature of the assembly, the metal 4a having the higher coefficient of thermal expansion would be placed on the outside of the bimetal element 4. In the contrary case, the metal 4b having the lower coefficient of expansion is placed on the outside. Thus, in the case where the metal 4a having the higher coefficient of thermal expansion is on the outside, the arcuate bimetal element 4 increases in camber as the temperature increases to accommodate the increased play between the roll and ferrule. On the other hand, where the metal 4b having the lower coefficient of thermal expansion is positioned on the outside, the arcuate bimetal element 4 decreases in camber as the temperature increases to lower the compressive loading couple in the joint between the roll and the ferrule.

I claim:
1. A roll assembly comprising:
    a cylindrically shaped roll body of a ceramic material having outwardly extending, axially aligned end portions at opposed ends thereof, said end portions have a plurality of circumferentially spaced apart recesses formed therein;
    a pair of metal ferrules having an inner cylindrical cavity, each metal ferrule adapted to engage a respective end portion of said ceramic roll body; and
    a plurality of thermodeformable bimetal elements comprising bonded metal strips, said bimetal elements positioned in said recesses circumferentially spaced apart around said ceramic roll body end portions and forceably interposed between each of said ceramic roll body end portions and said metal ferrules for thermal expansion in a single radial direction relative to said ceramic roll body end portions to accommodate a thermal expansion differential between said metal ferrules and said ceramic roll body end portions and to obtain a desired coupling strength between said metal ferrules and said roll body end portions at an elevated operating temperature.

2. The roll assembly of claim 1 wherein said bimetal elements have an arcuate shape.

3. The roll assembly of claim 1 wherein said bimetal elements are in the form of discs or washers.

4. The roll assembly of claim 1 wherein the ceramic roll body is of a fused silica material and wherein said thermodeformable bimetal elements each comprises an arcuately shaped, bonded metal strip of two layers of a nickel and a nickel alloy wherein an outer layer has a higher coefficient of thermal expansion than an inner layer.

* * * * *